Figure 1:
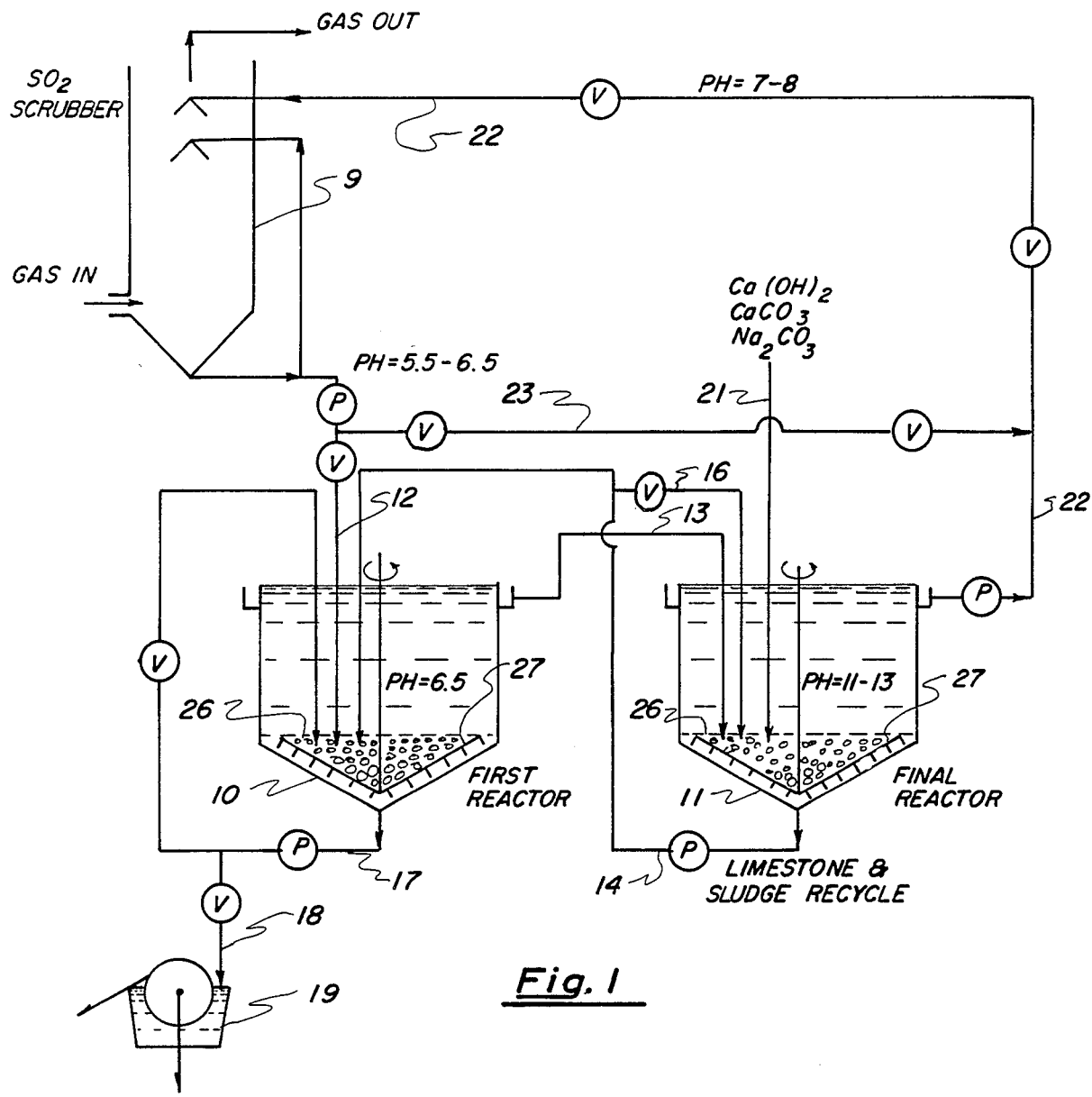

United States Patent [19]

Claerbout et al.

[11] Patent Number: 4,740,362
[45] Date of Patent: Apr. 26, 1988

[54] REGENERATION AND USE OF SO₂ GAS SCRUBBER LIQUID IN DUAL ALKALI SYSTEM

[75] Inventors: Paul F. Claerbout, Springfield; Steven J. Harvey, Newton; Robert S. Butler, Effingham; Jerry L. Simpson, Murphysboro, all of Ill.; James H. Wilhelm, Sandy, Utah

[73] Assignee: Central Illinois Public Service Company, Springfield, Ill.

[21] Appl. No.: 560

[22] Filed: Jan. 5, 1987

[51] Int. Cl.⁴ ............................................. C01B 17/00
[52] U.S. Cl. .................................... 423/242; 423/166; 423/511; 423/551; 423/555; 55/73
[58] Field of Search ..................... 423/242, 225, 210.5, 423/234, 166, 512 A, 519, 511, 555, 551; 55/73

[56] References Cited

U.S. PATENT DOCUMENTS

| | | | |
|---|---|---|---|
| 4,267,156 | 5/1981 | Daverman et al. | 423/512 A |
| 4,410,500 | 10/1983 | Wang et al. | 423/166 |
| 4,411,875 | 10/1983 | Butler et al. | 423/242 |
| 4,462,969 | 7/1984 | Wilhelm | 423/519 |
| 4,540,556 | 9/1985 | Wilhelm | 423/242 |
| 4,612,175 | 9/1986 | Harkness et al. | 423/243 |

Primary Examiner—Helen M. S. Sneed
Assistant Examiner—Anthony McFarlane
Attorney, Agent, or Firm—Robert R. Finch

[57] ABSTRACT

High efficiency scrubbing of SO₂ from stack gases by contact with a sodium based liquor is achieved by adjusting the pH of the scrubber liquor supplied to be in the range of 7.00 to 8.00; and a source of such liquor in a dual alkali system is disclosed in which a mixture of slaked lime and limestone is reacted with spent liquor in two stages one of which is at pH above 8.00, the other of which is at a pH below about 6.8 and the pH of the resulting regenerated liquor is adjusted to the desired pH range.

3 Claims, 1 Drawing Sheet

REGENERATION AND USE OF SO₂ GAS SCRUBBER LIQUID IN DUAL ALKALI SYSTEM

FIELD AND BACKGROUND

This invention relates generally to removal of gaseous sulfur dioxide from flue gas by scrubbing with a sodium based alkaline liquor which absorbs sulfur dioxide then regenerating or recausticizing the resulting spent scrubber liquor with a calcium compound such as slaked lime or limestone. Such systems are often referred to as dual alkali systems because the scrubber liquor utilizes sodium as the alkali in scrubbing while calcium is utilized to regenerate the sodium compounds.

For purposes of discussion, the essential equations involved in a system using lime and limestone are:

In the scrubber:

(1) $Na_2SO_3SO_2 + H_2O \rightarrow 2NaHSO_3$ (Some $Na_2SO_4$ is also produced)

and

In the recausticizing stage:

(2) $2NaHSO_3 + CaCO_3 \rightarrow CaSO_3 + Na_2SO_3 + CO_2 + H_2O$ (3) $H_2O + Na_2SO_4 + CaCO_3 \rightarrow CaSO_4 + 2NaOH + CO_2$ (4) $2NaHSO_3 + Ca(OH)_2 \rightarrow CaSO_3 + 2H_2O + Na_2SO_3$ (5) $Na_2SO_3 + Ca(OH)_2 \rightarrow CaSO_3 + 2NaOH$ (6) $Na_2SO_4 + Ca(OH)_2 \rightarrow CaSO_4 + 2NaOH$ Make-up sodium in the form of soda ash may be added to the liquor after recausticizing is completed or, in accordance with this invention, may be added with the lime and limestone.

A typical scrubber bleed liquor to be recausticized has a pH in the range of pH 5.5 to pH 6.0.

The present invention provides an improved scrubbing system that greatly improves scrubber efficiency; and it also provides an improved recausticizing process enabling achievement of the improved scrubber operation while still using relatively inexpensive limestone as a major source of calcium.

Traditionally, slaked lime has been employed in recausticizing because of its reactivity, but in the last decade improved systems have been developed in which relatively inexpensive limestone serves as the calcium source. A process of this type is disclosed in U.S. Pat. No. 4,462,969 in which process the recausticizing is carried out in separate, serially connected sludge blankets under conditions whereby ground limestone is retained sufficiently long to effect substantially complete utilization thereof, while only a relatively short liquor residence is required. In such earlier limestone process, the pH of the regenerated (recausticized) liquor is maintained well below pH 7.0, preferably about pH 6.2. This, because above about pH 6.5 the reaction rate of limestone drops and an unacceptably increased residence time of liquor and sludge is required to utilize the limestone and recausticize the liquor. Should a modestly higher pH be desired in a limestone system it may be achieved by greatly exceeding the stoichiometric limestone quantity, but this is impractical because of higher costs.

In contrast, when lime is used as the calcium source the end pH of the system and resulting regenerated scrubber liquor is in the broad pH range of pH 8.0–pH 13.0 but almost invariably in a range of about pH 11.0–pH 13.0. Thus, depending on whether the system is limestone or lime, prior scrubbers operate with inlet liquor that is either well below pH 7.0 or well above pH 8.0.

Both of the foregoing lime and limestone systems are in commercial use and are the subjects of continuing research and development to increase efficiency with resultant cost savings.

SUMMARY AND BRIEF DESCRIPTION

We have discovered that, in a dual alkali system, if the pH of the regenerated scrubbing liquor is adjusted to be in the range of pH 7.0–pH 8.0 the efficiency of the scrubber increases markedly. Further, we have developed a dual alkali system to employ limestone as an economically significant calcium source yet still yield a scrubber liquor in the pH 7.0–pH 8.0 range.

It is therefore the primary object of the invention to provide an improved dual-alkali gas-scrubbing and liquor-regeneration system wherein, by maintaining the scrubber liquor in a selected pH range gas scrubber efficiency is maximized.

Another major object is provision of ways and means in a dual-alkali system to yield a regenerated liquor in the pH range of pH 7.0–pH 8.0 while still utilizing relatively inexpensive limestone as a significant source of the required calcium.

Still another object is provision of a dual alkali system as described in which limestone remains a major calcium source but is combined with lime in preconditioning as by grinding, slaking and stirring, and added to the system as a single stream whereby reaction conditions in the system may be essentially controlled at the preconditioning stage. Coveniently soda ash may be added to the mix.

A related object is provision of a dual alkali system in which reaction occurs in separated first and second reaction masses in serially connected first and second vessels under conditions whereby the final reaction vessel yields a clarified regenerated liquor ready for use without further clarification, while a dense solids fraction is withdrawn for recycle to and reaction in the first reactor and thereafter to filtration for waste.

In accordance with the broadest aspect of the invention, scrubber efficiency is markedly and unexpectedly increased by adjusting the pH of regenerated scrubber inlet liquor to a range of pH 7.0–pH. 8.0 before it is injected into the scrubber. If the liquor is above pH 8.0 it may be diluted with scrubber bleed liquor; and if it is below pH 7.0 it may be adjusted upwardly by combination with higher pH liquor or, in accordance with the preferred embodiment of this invention hereinafter described, by use of the addition of more slaked lime to the final stage of recausticizing.

In a preferred embodiment of the invention in a dual alkali system, a mixture of limestone and lime provides the calcium. Soda ash is added as needed. All three reactants may be combined in a preconditioning system where measured amounts of the lime, limestone and soda ash are ground as necessary, slaked and stored for injection as a single stream.

The preferred embodiment is a counter current system comprising two serially connected reactors, preferably of the sludge blanket type, in which recausticizing is carried out. Spent scrubber liquor is initially introduced into a first reaction mass in the first reactor while the reactant stream (lime, limestone and soda ash) is initially introduced to a second reaction mass in the second reactor. The reaction masses comprise regenerating liquor, slaked lime, ground limestone and, if needed, soda ash. liquor flows through the first, then the second reactor whence it returns to the scrubber. Sludge from the second reactor flows back to the first reactor from which it may be eventually wasted. Sludge is recycled within both reactors as desired.

In this system the spent liquor which is at low pH reacts with limestone and residual slaked lime in the first vessel where conditions are adjusted to maximiize consumption of both limestone and slaked lime. The resulting partially regenerated liquor is then flowed to the higher pH second mass where it contacts the fresh slaked lime and its regeneration to usable liquor is completed.

Typically, the spent scrubber bleed liquor is at pH 5.5 to pH 6.0. The first reactor is maintained in the range of from pH 6.0–pH 6.5 while the second reactor is maintained in the range from pH 11.0–pH 13.0 and the resulting liquor (pH 11.0–pH 13.0) is diluted with scrubber bleed liquor (pH 5.5–pH 6.0) to yield a product liquor of pH 7.0–pH 8.0 for introduction into the scrubber.

Our preferred embodiment presents a process that is a combination of limestone and lime dual-alkali systems in which relatively inexpensive limestone provides a significant part of the calcium while the lime, in addition to furnishing calcium also provides the bridge to the final range of pH 7.0–pH 8.0 to achieve better scrubber operation.

The proportions of limestone, lime and soda ash will vary depending on the characteristic of the materials and the actual environment. However, they may be initially calculated then adjusted empirically.

DRAWING AND DETAILED DESCRIPTION

In order that the invention may be more readily understood and carried into effect, reference is made to the attached drawing and description thereof which are offered by way of exmaple only and not in limitation of the invention the scope of which is defined by the appended claims and equivalents embraced therein rather than any description.

FIG. 1 is a simple line diagram depicting the flow sheet of a dual-alkali system embodying our invention.

As shown in FIG. 1, the system, which accepts scrubber bleed liquor from a typical scrubber 9, comprises a first reactor 10, a second reactor 11, an inlet conduit 12 for supplying spent scrubber liquor from the scrubber into submergence in the contents of the first reactor, a second conduit 13 for conducting overflow from the first reactor into submergence in the second reactor, a recycle conduit 14 enabling cycling sludge, including limestone, from the second reactor back to the first, and a branch conduit 16 to recycle sludge internally of the second reactor.

Sludge from the first reactor is cycled internally of the first reaction zone via a suitable conduit 17, a conduit 18 being provided to conduct some sludge to a suitable filter 19 whence it is wasted. Each of the conduits should be provided with suitable valves and/or pumps as needed to carry out the desired transfer.

A suitable conduit 21 or other supply means is provided to introduce the limestone- lime- soda ash mixture to the second reactor. A conduit 22 is provided to conduct regenerated liquor to the scrubber; and a conduit 23 is provided to inject scrubber bleed liquor into the conduit 22 carrying regenerated liquor in order to dilute the liquor as needed to achieve the desired pH of pH 7. to pH 8. As previously mentioned, valves and pumps are employed as necessary to effect the desired flows.

The limestone and lime are desirably crushed together in a preparation station concomitantly with slaking of the lime. If needed, soda ash will also be added here. The proportion of reactants will be established at the preparation station and a supply of mixed material maintained in a feed tank whence it may be supplied to the second reactor as needed. In operation, only a relatively small supply of the prepared limestone-lime-soda ash mix will be kept on hand so that ratio changes can be easily accomplished.

In the system illustrated, both reactors are the sludge blanket type in which a relatively dense blanket 26 is maintained in each reactor. The blanket is kneaded, primarily by action of slowly moving rakes 27, to gently mix the solids and liquor without substantial agitation. In this connection, it is noted that too much stirring will release fines that pass over the overflow weir into the final conduit 22 with the regenerated liquor. If this happens, the liquor will have to be further clarified before it can be used in the scrubber. In the configuration shown, the sludge blankets in reactors 10 and 11 are operated generally as described in U.S. Pat. No. 4,462,969.

In recausticizing, limestone simply does not react well above about pH 6.5. Thus, only lime will react in the second reactor which is at pH 11.0–pH 13.0; and there is essentially no liberation of $CO_2$ therein so the conditions are quiescent and the resulting supernatant liquor clear. Then, in the first reactor, both limestone and residual lime react with the fresh scrubber bleed liquor.

The ratio of limestone to lime is adjusted to achieve the desired end result of substantially complete reaction of the limestone in the first reactor and to completion of regeneration of liquor by lime in the second reactor. The limestone and lime ratio is adjusted so that pH in the first reactor is in the range of pH 6.2–pH 6.5 while the second reactor is maintained in the range of pH 11.0–pH 13.0. In the feed mix, the limestone content determines the pH in the first reactor while the lime content controls pH in the second reactor. From data based on tests and calculations, the expected molar ratio is 50%–75% limestone to 25%–50% slaked lime.

The increased benefits derived from the present invention may be directly measured. In actual tests on a full operational installation the increased scrubbing efficiencies were observed and measured during operations with scrubber liquors at various pH levels.

The flue gas being scrubbed was the continuous discharge from a full scale coal-fired power plant operated by Central Illinois Public Services Co. at Newton, Ill. The scrubber was a counter current type with top liquor inlet. A dual alkali system is in use at the plant. During tests to determine scrubber efficiency, the regenerated scrubber inlet liquor was the product of three operations. (1) Liquor at a pH above pH 8.0 was produced while the system operated with lime as the calcium source. (2) Liquor at pH below pH 7.0 was yielded from the process when operated with limestone as the sole calcium source. (3) liquor in the range of pH 7.0–pH 8.0 was the transient product as the recausticizing system was slowly changed over from the high (pH 11.0–pH 13.0) lime system to the low (pH 6.2–pH 6.5) limestone system and vice versa.

The data show that when the inlet liquor is either below pH 7.0 or above pH 8.0 the scrubbing efficiency was such that residual sulfur dioxide was in the range of 0.3 to 1.0 lbs of $SO_2$ per million BTU which corresponds to total SO₂ removal of 77% to 93.3%. In contrast, when the inlet scrubbing liquor was in the pH 7.0–pH 8.0 range, the scrubbing efficiency improved so much that residual sulfur dioxide decreased to a range of 0.07 to 0.2 lbs SO₂ per million BTU which corresponds to an incrased total SO₂ removal of 95.5% to 98.5. This is a significant increase in scrubbing efficiency that ranks the operation so far above emission standards that it has ample leeway to accomodate coal with higher sulphur content or to mix by-passed gas with the existing outflow without damage to the environment.

If the regeneration system uses only lime it will yield a regenerated liquor above pH 8.0 (pH 11.0–pH 13.0 is typical) but it will be adjusted by dilution with scrubber bleed liquor (pH 5.5–pH 6.0) to achieve pH 7.0–pH 8.0.

In accordance with the preferred specific embodiment of this invention, a recausticizing system is provided in which limestone provides a significant portion of the calcium to achieve cost savings while lime provides the balance of the required calcium and the drive necessary to reach the higher pH.

The basic flow sheet as shown in FIG. 1 has been tested on a laboratory scale using small cylindrical tanks of which the first reactor was 18" in diameter and the second was 12" in diameter. The tanks were connected as shown in FIG. 1. Both reactors were operated with reaction masses in sludge blankets. A mixture of slaked lime and ground limestone was pumped into the second reactor. The scrubber bleed liquor (simulated) at a pH 5.5 was split, part going to adjust the pH of the product liquor from second rector overflow and the balance to the first reactor. The pH in the second reaction mass was maintained in the range of pH 8.0 to pH 12.5 (but 90% of the time was between pH 11.3 to pH 12.5) while the first reactor was maintained between pH 5.8 and pH 6.5. This demonstrated that the reactions of the mixture occurs in the separate vessels according to the pH therein and that lime reaction occurs in the second mass to the exclusion of limestone to yield readily filterable waste cake and a suitably clarified liquor ready for dilution and recycle.

At the high pH in the second reactor readily filterable solids are produced which is an advantage in operation. Also, high pH inhibits limestone reaction so there is no CO₂ liberation, hence, the reactor is quiescent and the resulting high pH supernatant liquor is clear and does not require further clarification before use.

In the laboratory tests limestone and lime were mixed in a 50–50 ratio molar basis.

Liquor residence time in the first reactor was 180 minutes and in the second was 74 minutes. These times are illustrative only and will change in full scale operation. The test confirms that at the higher reaction rate of lime in the second reactor a shorter residence time and correspondingly smaller tank may be used.

The test was run continuously for 6 hours. At the conclusion, there was about 25% unreacted limestone in the waste solids discharged from the first reactor. In a full scale plant the solids residence will be increased to achieve about a 90% reaction of limestone. Also, the lime ratio may be adjusted downwardly from the 50–50 ratio based on operations and the efficiency of utilization of limestone.

From the foregoing it is apparent that in regeneration of sodium based scrubber liquor, improved utilization of ground limestone may be achieved by mixing the limestone with slaked lime then reacting it with the regenerating liquor in two separate stages at different pH levels; and further, that by proper adjustment of the pH of the scrubber liquor, scrubber efficiency is markedly improved.

There are many variables in gas scrubber and liquor recausticizing systems, but simple tests will pemit exact operating parameters to be determined empirically without departing from the scope of this invention.

Having described our invention and the best mode currently known to us for practice thereof, that which we desire to secure by Letters Patent is set forth in the annexed claims.

What is claimed is:

1. In a dual alkali gas scrubber liquor regeneration method wherein SO₂-bearing gas is scrubbed in a scrubber with a sodium based alkaline scrubbing liquor and the resulting spent scrubber liquor is regenerated for recycle to the scrubber, the improvement comprising the steps of establishing and maintaining separate first and second reactors that contain regenerating scrubber liquor and a mixture of slaked lime and ground limestone by continuously moving spent scrubber liquor sequentially into and through said first reactor then into said second reactor while continuously moving said mixture of slaked lime and ground limestone counter to said liquor sequentially into and through said second reactor then said first reactor, effecting causticizing reaction between regenerating liquor and calcium compounds in both said reactors then separating liquor from solids therein, discharging waste solids from said first reactor and product liquor from said second reactor, and controlling reaction conditions in said reactors to yield a regenerated product liquor of pH above 8, by maintaining the pH in said first reactor to be below about pH 6.8 and the pH in said second reactor and product liquor discharged from second reactor to be above pH 8.0 by adjusting the relative amounts of slaked lime and ground limestone in said mixture thereof supplied to said second reactor, and adjusting the pH of said product liquor after discharge from said second reactor to lie in the range from pH 7. to pH 8. and thereafter recycling said product liquor to said scrubber.

2. Method according to claim 1 wherein the pH in said second reactor is in the range of pH 11.0 to pH 13.0, a sludge blanket is maintained in said second reactor, said mixture of slaked lime and limestone is detained in said second reactor until reaction of said regenerating liquor with slaked lime is substantially complete, and said mixture of slaked lime and limestone is detained in said first reactor until reaction between said regenerating liquor and slaked lime is substantially complete.

3. Method according to claim 1 in which the pH in said second reactor is maintained in the range from about pH 11.0 to about pH 13.0, and said liquor is retained therein until its reaction with slaked lime is substantially complete, and said liquor is thereafter diluted to pH 7.0 to pH 8.0 by addition thereto of spent scrubber liquor discharged from said scrubber.

* * * * *